US009099271B2

(12) United States Patent
Constantin et al.

(10) Patent No.: US 9,099,271 B2
(45) Date of Patent: Aug. 4, 2015

(54) METHOD AND SYSTEM FOR OPERATING ELECTRON GUNS IN MAGNETIC FIELDS

(71) Applicant: The Board of Trustees of the Leland Stanford Junior University, Palo Alto, CA (US)

(72) Inventors: Dragos E. Constantin, Los Altos, CA (US); Rebecca Fahrig, Palo Alto, CA (US); Paul J. Keall, Greenwich (AU)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 361 days.

(21) Appl. No.: 13/622,212

(22) Filed: Sep. 18, 2012

(65) Prior Publication Data

US 2013/0035905 A1 Feb. 7, 2013

Related U.S. Application Data

(63) Continuation-in-part of application No. 13/565,343, filed on Aug. 2, 2012.

(60) Provisional application No. 61/626,009, filed on Sep. 19, 2011, provisional application No. 61/574,432, filed on Aug. 2, 2011.

(51) Int. Cl.

| | |
|---|---|
| ***G06F 17/50*** | (2006.01) |
| ***H01J 3/02*** | (2006.01) |
| ***H05H 7/08*** | (2006.01) |

(52) U.S. Cl.

CPC ................. *H01J 3/027* (2013.01); *H01J 3/029* (2013.01); *H05H 7/08* (2013.01); *H05H 2007/084* (2013.01)

(58) Field of Classification Search

None

See application file for complete search history.

(56) References Cited

U.S. PATENT DOCUMENTS

| | | | | |
|---|---|---|---|---|
| 6,326,861 | B1 * | 12/2001 | Villa | 333/20 |
| 2011/0089829 | A1 * | 4/2011 | Teryaev et al. | 315/5.39 |
| 2011/0216886 | A1 * | 9/2011 | Ho et al. | 378/137 |

OTHER PUBLICATIONS

Ganter et al. Low Emittance Fun Project Based on Field Emission Proceedings of the 2004 FEL Conference, pp. 602-605.*

Wen et al. Robust x-ray tubes for use within magnetic fields of MR scanners Med. Phys. 32 (7) Jul. 2005.*

Bieniosekl et al. DARHT 2 kA Cathode Development Mar. 9, 2009.*

* cited by examiner

*Primary Examiner* — Saif Alhija
*Assistant Examiner* — Cuong Luu
(74) *Attorney, Agent, or Firm* — Lumen Patent Firm

(57) ABSTRACT

A method of configuring an electron gun for generating and injecting an electron beam into a linac accelerating waveguide operating in magnetic fringe fields of an MRI scanner in the absence of a magnetic shield is provided using an appropriately programmed computer to determining an anode drift tube diameter at an injection point of a linac according to a magnetic field value from an MRI scanner and to a predetermined current density, where the magnetic field has an isocenter, determining a transverse diameter of a Type M cathode in an electron gun, according to the anode drift tube diameter and the current density, and minimizing an emittance value in an electron beam of the electron gun at an entry point of the anode drift tube by optimizing the distance between the cathode and the anode, where the electron beam is along an axis of symmetry of the magnetic field.

5 Claims, 4 Drawing Sheets

METHOD AND SYSTEM FOR OPERATING ELECTRON GUNS IN MAGNETIC FIELDS

CROSS-REFERENCE TO RELATED APPLICATIONS

This application is a continuation-in-part of U.S. patent application Ser. No. 13/565,343, filed Aug. 2, 2012, which is incorporated herein by reference. U.S. patent application Ser. No. 13/565,343, filed Aug. 2, 2012 claims the benefit of U.S. Provisional Patent Application 61/626,009 filed Sep. 19, 2011, which is incorporated herein by reference. Application Ser. No. 13/565,343 filed Aug. 2, 2012 claims priority from U.S. Provisional Patent Application 61/574,432, which is incorporated herein by reference.

STATEMENT OF GOVERNMENT SPONSORED SUPPORT

This invention was made with Government support under contract T32-CA09695 awarded by National Institutes of Health (NIH). The Government has certain rights in this invention.

FIELD OF THE INVENTION

The invention relates generally to electron guns. More particularly, the invention relates to electron gun geometry capable to robustly function in the presence of high strength external magnetic field for axisymmetric configurations.

BACKGROUND OF THE INVENTION

The ideal image guidance strategy in radiation therapy is to have real-time volumetric and position information of the tumor and surrounding healthy tissue during the treatment itself. One compelling approach is to use magnetic resonance imaging (MRI), which is a non-invasive technique that not only allows real time volumetric imaging but also provides exquisite soft tissue contrast to differentiate cancerous from healthy tissue. To date two base MRI-linac configurations were proposed, i.e. the in-line and the perpendicular configurations, which are defined by the relative orientation of the medical linac with respect to the main magnetic field of the MRI scanner. Regardless the configuration the relative position between the linac and the MRI isocenter is fixed with the linac pointing at it. This fact limits the use of the medical linac to gating or dynamic multileaf collimator (DMLC), or a combination of these two radiation treatment modalities.

What is needed is an electron gun having a geometry capable to robustly function in the presence of high strength external magnetic field for axisymmetric configurations. What is further needed is an electron gun having a geometry where an MRI-linac can operate without the need to isolate the linac using a magnetic shield, where such a configuration would not only leave the magnet homogeneity unchanged but also provide the linac the flexibility to move along the magnet axis of symmetry if the source to target distance needs to be adjusted.

SUMMARY OF THE INVENTION

To address the needs in the art, a method of configuring an electron gun for generating and injecting an electron beam into a linac accelerating waveguide operating in magnetic fringe fields of an MRI scanner in the absence of a magnetic shield is provided that includes using an appropriately programmed computer to determining an anode drift tube diameter at an injection point of a linac where the anode drift tube diameter is according to a value of a magnetic field from an MRI scanner and according to a predetermined current density, where the magnetic field has an isocenter. The method further includes using the appropriately programmed computer to determine a transverse diameter of a Type M cathode in an electron gun, where the transverse diameter of the cathode is according to the anode drift tube diameter and the current density, and minimizing a value of emittance in an electron beam of the electron gun at an entry point of the anode drift tube, where the minimization comprises optimizing the distance between the cathode and the anode, where the electron beam is directed proximal to an axis of symmetry of the MRI magnetic field.

According to one aspect of the invention, the linac is aligned with field lines of the MRI scanner.

In a further aspect of the invention, a path of the electron beam and a main magnetic field of the MRI scanner are in-line.

In one aspect of the invention, Twiss parameters are used by the appropriately programmed computer to determine a length of the anode drift tube, where the Twiss parameters are according to axial position and capture efficiency of the linac.

In yet another aspect of the invention, the beam emittance is a figure of merit, where the figure of merit is used to determine a beam laminarity.

According to one aspect of the invention, a focusing electrode is disposed proximal to the cathode, wherein divergence of electric field lines at the linac injection point are reduced.

DETAILED DESCRIPTION

In the following description, a specially designed electron gun is provided, which can operate in the presence of strong magnetic fringe fields of MRI magnets. Computer simulations show that the electron gun can produce high quality beams, which can be injected into a straight through medical linac waveguide like the Varian 600C linac with more efficiency in the presence of axisymmetric external magnetic fields.

The current invention provides an electron gun configuration, which enables a new MRI-linac configuration capable of making full use of the positional information provided by the MRI scanner and adapts the linac orientation so it can track the tumor motion and continuously deliver dose. This electron gun and MRI-linac configuration, called robotic linac adaptation (RLA) configuration, is a generalization of the in-line MRI-linac configuration with no magnetic shielding.

Figure 1:
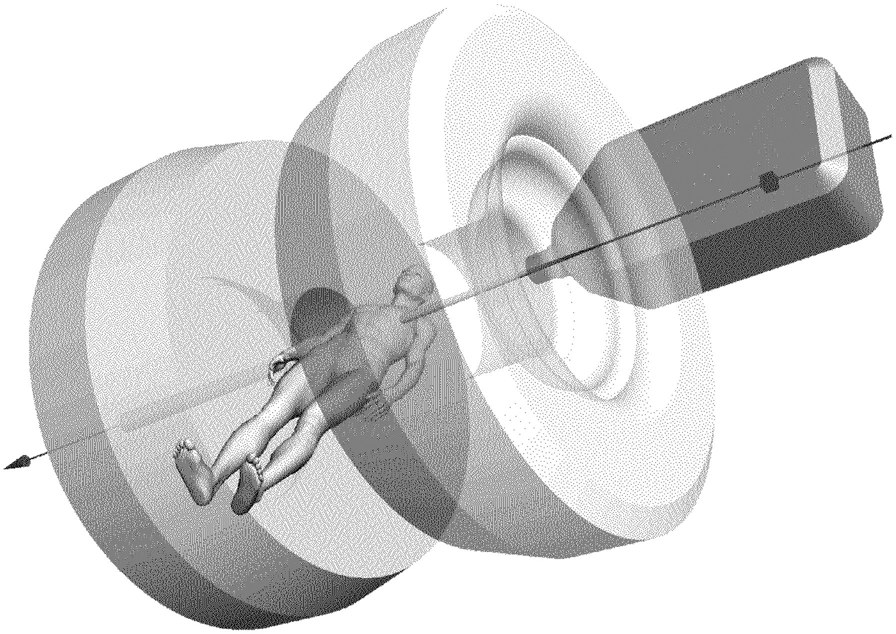
FIG. 1 shows a schematic drawing of the in-line MRI-linac apparatus, according to one embodiment of the invention.

The RLA configuration is based on the observation that an electron beam will stay confined in the presence of an axially symmetric field. The generalization resides in relaxing the perfect axial symmetry condition and requires only that the linac is aligned with the field lines. This condition can be seen as a quasi axial symmetry condition if the field line curvature is much bigger than the length on the linac waveguide. The absence of the magnetic shield allows the linac to move without perturbing the magnet homogeneity. For this description, it is assumed that all the magnetic components present in the linac construction are replaced with magnetically compatible parts. The mrT magnet is not shielded which makes the fringe field to be quasi uniform close to the magnet axis of symmetry despite its relatively high strength. Even if the fringe field has a high value in the range of interest, the relatively good homogeneity keeps the induced eddy currents in the linac and copper structures very small. The electromagnetic coupling between the systems reduces the degrees of freedom regarding possible orientations of the linac and MRI subsystems. One solution is to keep the relative position between the patient and each subsystem unchanged in the hybrid system; the main magnetic field is perpendicular to the treatment beam and thus to the electron beam. This configuration, referred to from now on as the perpendicular configuration, has no symmetry. Another solution with axial symmetry places the linac and the MRI machines such that the electron beam path and the main field of the MRI system are in-line. This solution requires the relative position of the patient with respect to the MRI scanner to be changed, as shown in FIG. 1, where the treatment beam is in-line with the main magnetic field of the MRI magnet, according to one embodiment of the invention. Here the patient is positioned between the poles of the open bore MRI magnet in a perpendicular position with respect to the main magnetic field and the treatment beam. Because the in-line design has axial symmetry one can employ Bush's theorem and conclude that in this case the external magnetic field will have no major impact on electron beam optics inside the accelerating waveguide in terms of defocusing effects. In fact the existence of the external axial field will cause magnetic confinement of the beam and this effect can be used to keep the electron beam focused along the accelerator waveguide. This is the main reason why a magnetic shield is not necessary for an in-line MRI-linac configuration. However for this to work the electron gun has to be redesigned to effectively generate and inject the electron beam inside the accelerating waveguide. The current invention provides an electron gun capable to function in the fringe field of a MRI scanner without any magnetic shielding.

Figure 2:
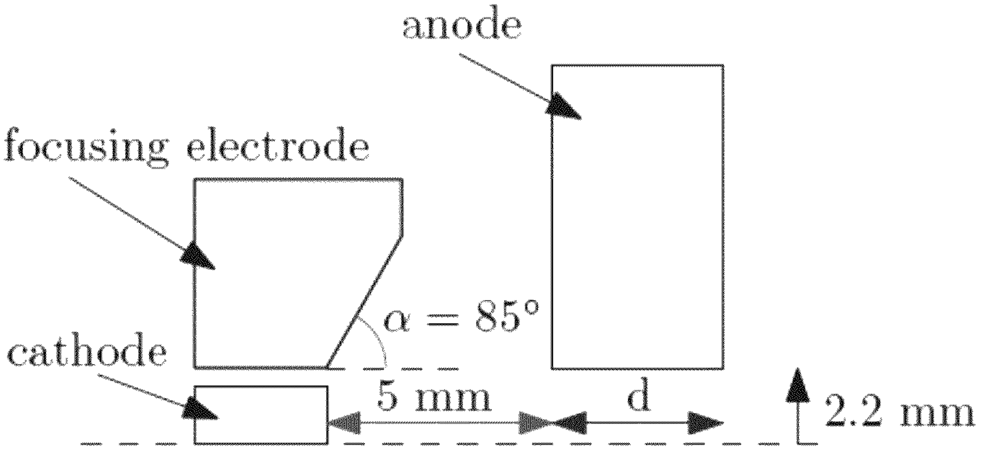
FIG. 2 shows a diagram of a new electron gun geometry, according to one embodiment of the invention.

Since there is no magnetic shielding present for the linac, the electron gun geometry of the current invention is configured to allow its operation in external fields. According to one embodiment, the electron gun is modified together with the corresponding accelerating waveguide to ensure proper electron beam capture and acceleration when magnetic fields are present. In one embodiment, the electron gun configuration comprises three steps. First, modifications of the OT electron gun geometry are considered and the behavior of the altered electron gun geometry in external fields is characterized. Second, based on the observations gathered from the first step, a new electron gun geometry, for example the geometry shown in FIG. 2, is generated and optimized to work at 0:19 T based on the results of the previous analysis. In this example, the value of the magnetic field of 0:19 T corresponds to the value of the magnetic field of the mrT magnet 130 cm away from the MRI isocenter. Because, the distance between the electron gun cathode, i.e. the electron emitting surface, and the linac tungsten target is roughly 30 cm, this means that a 1.3 m distance between cathode and the MRI-linac isocenter places the linac target button at the standard distance of 1.0 m away from the isocenter. In the third and last step the anode drift tube length is determined such that the linac capture efficiency is maximum. For this example, electron beam generation and initial acceleration through the electron gun geometry was simulated with a full three-dimensional (3D) model using SCALA (Vector Fields Ltd. OPERA-3d). The SCALA model includes the effect of the space charge interactions, which affect beams of charged particles, and arbitrary three-dimensional external magnetic fields can be taken into account. SCALA could also include the self magnetic fields generated by the beam. However, the simulations showed no change due to these fields especially in the presence of strong external magnetic fields and this effect can be neglected and it was not included in the simulation. In addition the simulation includes neither secondary electrons nor backscattered electrons, as the main goal of the gun geometry design is to avoid these phenomena. Langmuir-Fry law was used to model the thermionic emission at cathode surface for the new electron gun geometry. This achieved a great balance between the simulation realism and the computation time. However, use of Child's law for the first step of the analysis to remains consistent with the original simulations performed with EGN2w (Stanford Linear Accelerator, Calif.). The electron beam transport in SCALA is simulated using macroparticles, which are defined as assemblages of many physical particles of the same type, e.g., electrons, which are treated as single units. The electron beam phase space is obtained by recording the individual contributions of any macroparticle that crosses a plane perpendicular to the gun axis located at the gun exit position. The phase space information of theses macroparticles allows the computation of the electron beam twiss parameters, where the twiss parameters include $\alpha$ and $\beta$. The twiss parameters together with beam emittance $\epsilon$ characterize the statistical properties of the real electron beam. The twiss parameters characterize the beam convergence. In this sense $\alpha$ is positive for convergent flow, zero for parallel flow, and negative for divergent flow. The $\beta$ twiss parameter is always positive and it is used together with a to define the slope of the beam envelope as $-\alpha/\beta$. Also, the beam emittance describes the dynamic properties of the particles in the beam. The twiss parameters are later used to simulate the electron beam injection and acceleration along the linac from 30.7 keV to 6 MeV. This allows determination of the waveguide capture efficiency whose maximum value is used to determine the length of the anode drift tube (d) in FIG. 2. This is because the twiss parameters depend on the axial position where they are computed and their value controls the value of the linac capture efficiency.

Figure 3:
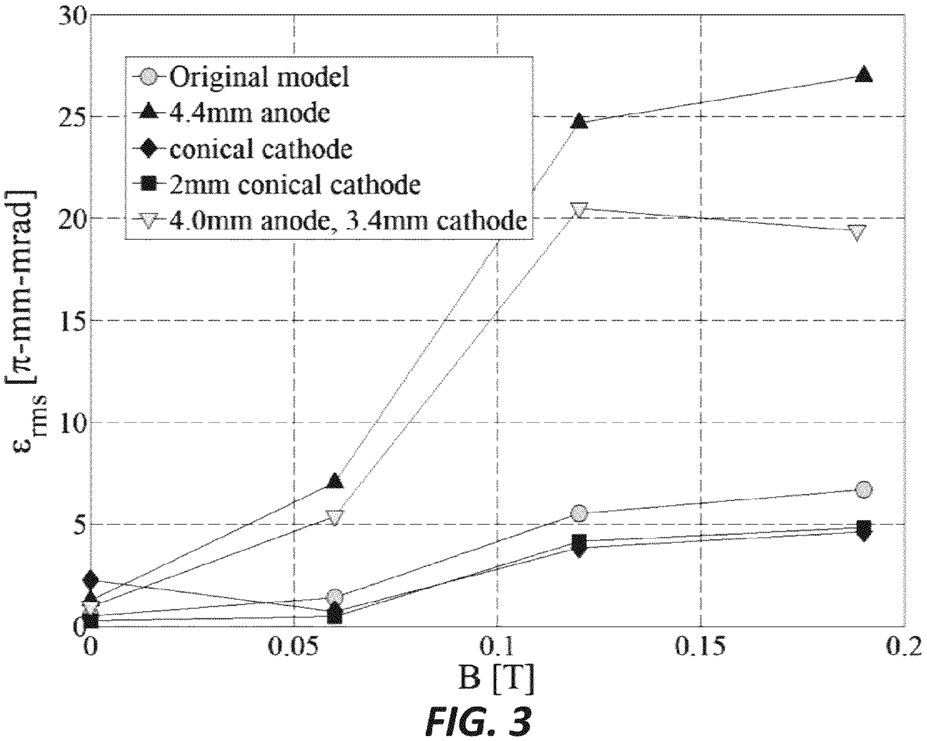
FIG. 3 shows simulation results of beam emittance at the gun exit for various external field strengths and various gun geometries, according to embodiments of the invention.
Figure 4:
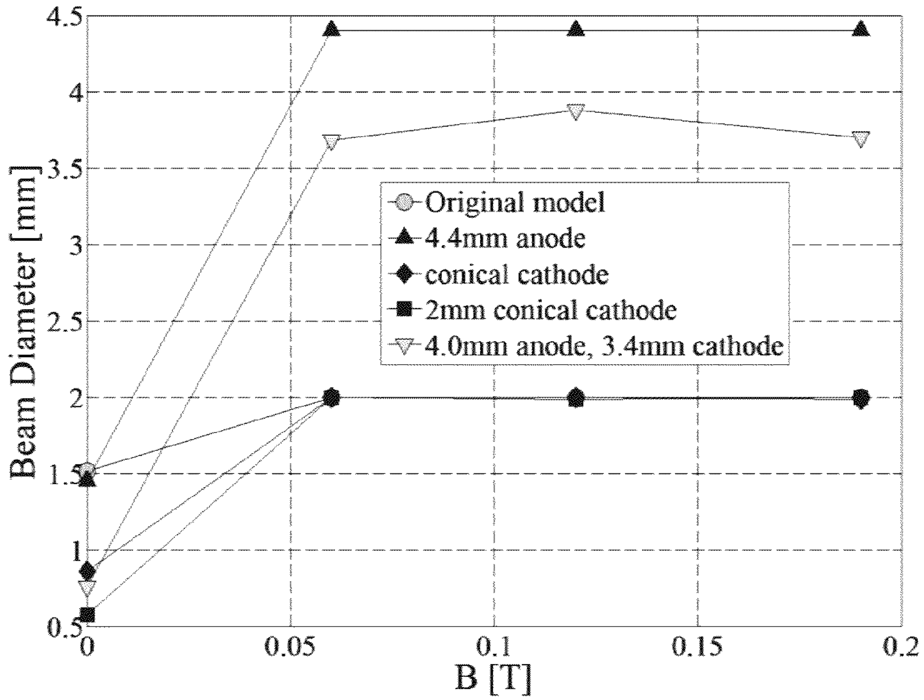
FIG. 4 shows simulation results of beam diameters at gun exits for various external field strengths and various gun geometries, according to embodiments of the invention.
Figure 5:
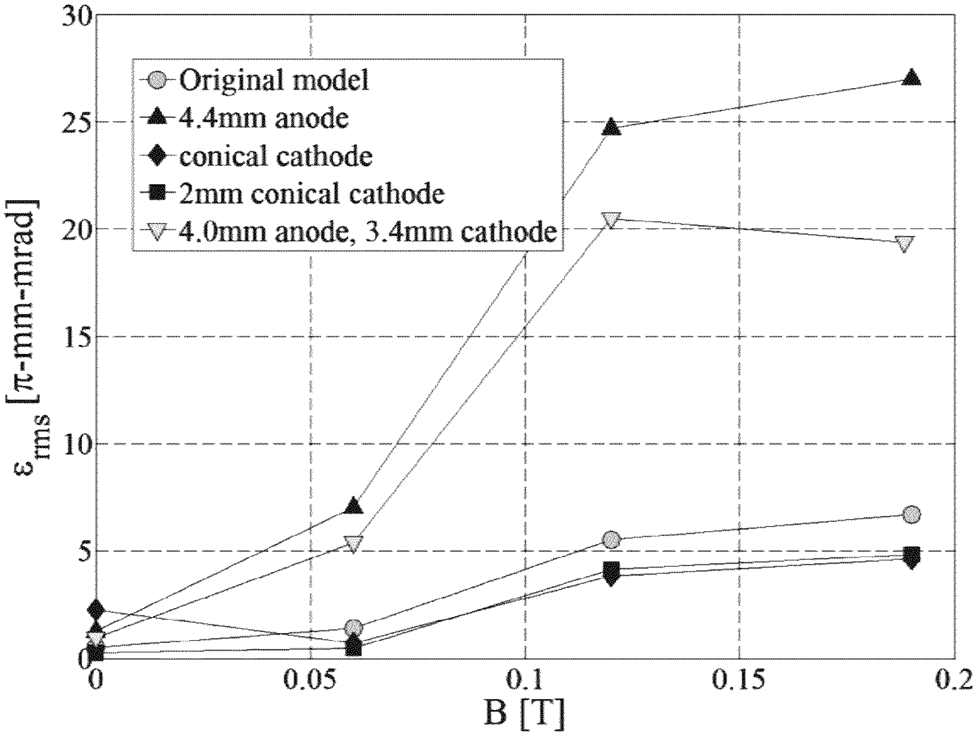
FIG. 5 shows simulation results of beam currents at gun exits for various external field strengths and various gun geometries, according to embodiments of the invention.

To generate design principles for the new electrode geometry and based on previous observations of the gun behavior in external magnetic fields, a set of simulations with simple modifications of the original gun geometry were performed. The original geometry has a 2.0 mm diameter anode drift tube and a 4.62 mm cathode transverse diameter. There were considered four distinct cases corresponding to a 4.4 mm cathode transverse diameter, a 150° conical cathode with 4.62 mm base diameter, a 150° with a 2.0 mm base diameter, and a geometry with 3.4 mm transverse diameter cathode and a 3.4 mm anode drift tube diameter. The beam emittance, the beam diameter and the beam current at gun exit were computed at various field strengths for the original geometry and the four slightly modified gun geometries and the results are reported in FIG. 3, FIG. 4 and FIG. 5 respectively. First in FIG. 3 the emittance increases in all cases. The emittance is a figure of merit, which characterizes beam laminarity. The smaller the emittance, the better the beam quality. To alleviate this, the electrons will have to be generated and accelerated along the field lines of the magnetic field. This constrains the cathode surface to coincide with the equisurfaces of the magnetic field, which are almost flat at the cathode location. Second in FIG. 4 the beam diameter increases for all the cases, which is not desired as this leads to current loss due to beam interaction with the anode drift tube walls. However in FIG. 5 a smaller cathode produces a larger current than the anode opening, which indicates less current loss inside the anode drift tube. This is a good indication that the size of the diameter of the anode drift tube and the cathode transverse diameter have to be carefully chosen. It was determined that a Type-M cathode, which has a work function of 1.8 eV, with a transverse diameter of 1.7 mm will generate 0.361 A at a temperature of 1189K. This means the workload will be of about 4 A/cm$^2$ and it translates to a cathode lifetime of several years. To avoid diverging of the accelerating field lines in the space between the cathode and anode, a focusing electrode was placed in the close vicinity of the cathode. It was determined that the optimum focusing angle is 85°. The cathode drift tube diameter is 2.2 mm, which is slightly larger than the original geometry. The distance between the cathode and the anode is not an essential parameter of the model, as it does not qualitatively modify the laminarity of the beam. However, this parameter impacts the value of the beam emittance at the entry point in the anode drift tube and it was chosen to be 5.0 mm, which corresponds to a minimum value of the beam emittance.

Figure 6:
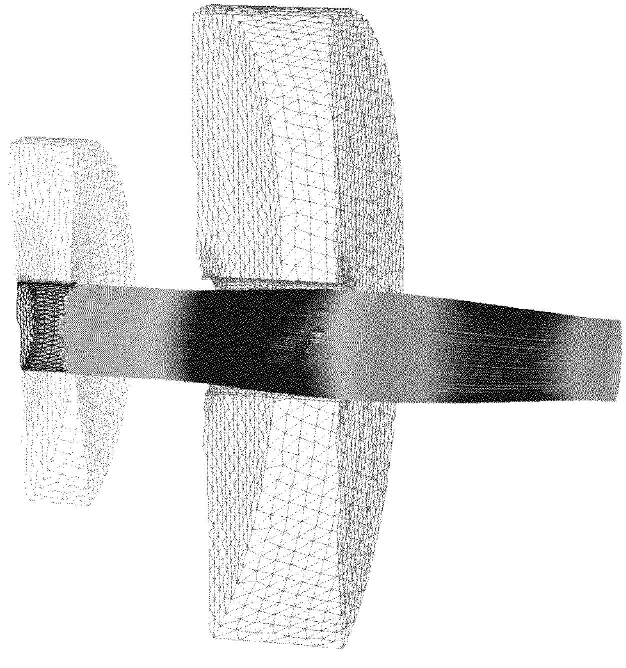
FIG. 6 shows simulation results of a new electron gun geometry with solution in the fringe field of the mrT magnet, where the gun was positioned 1.3 m away from the mrT isocenter which correspond to a mean field strength of about B=0.19 T, according to one embodiment of the invention.

The newly designed electron gun and its corresponding space charge solution are presented in FIG. 6. The electrons in the beam are experiencing a mean magnetic field strength B=0.19 T. The magnetic beam confinement shown in FIG. 6 is a direct consequence of the Bush's theorem, which is valid only for axially symmetric configurations. The fact that the in-line MRI-linac configuration has axial symmetry is fundamental. This allows for an electron gun to function in external magnetic field without the need of decoupling the physics of the MRI scanner and the medical linac.

Figure 7:
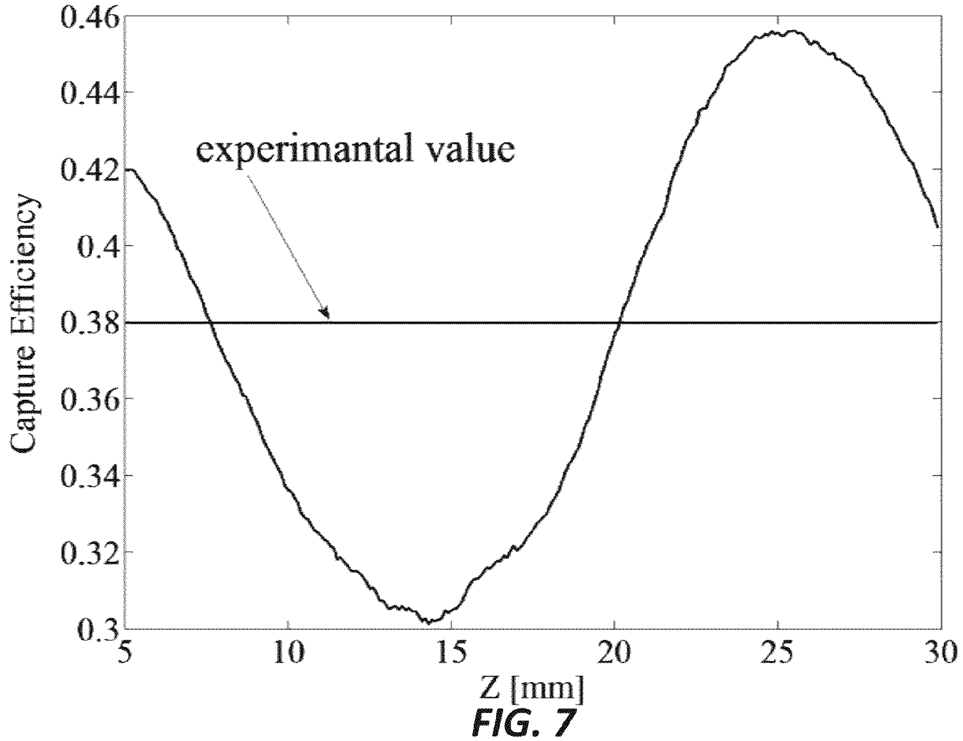
FIG. 7 shows waveguide capture efficiency as a function of axial coordinate, where the origin coincides with the cathode surface, according to one embodiment of the invention.
Figure 8:
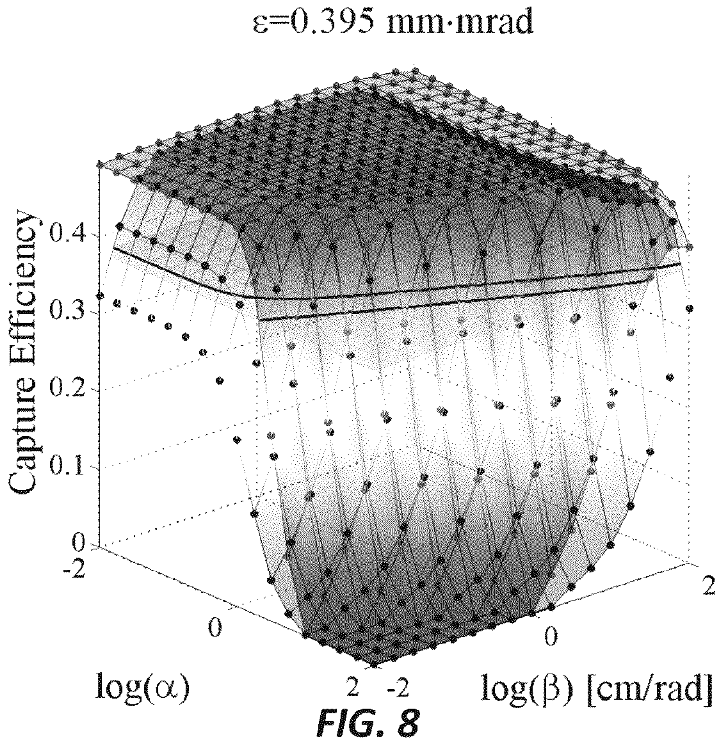
FIG. 8 shows simulation results of capture efficiency as a function of Twiss parameters $\alpha$ and $\beta$ for a fixed emittance value ($\epsilon$=0.395 mm-mrad) in the absence (lower surface) and presence (upper surface) of external magnetic field. According to one embodiment of the invention.

To determine the optimum injection point, i.e the length of the anode drift tube, the waveguide capture efficiency was determined as a function of the coordinate along the gun axis. In FIG. 7 both the reported capture efficiency at zero magnetic field and the capture efficiency of the waveguide are shown. The maximum capture efficiency occurs approximately 25 mm away from the cathode and is 20% higher than the capture efficiency at zero field. This means the anode drift tube will be 20 mm long. The new electron gun geometry not only alleviates the problem of current loss through the beam collision with the anode but it also improves the capture efficiency of the waveguide in the presence of the external magnetic field as shown in FIG. 8, where shown are simulation results of capture efficiency as a function of Twiss parameters $\alpha$ and $\beta$ for a fixed emittance value ($\epsilon$=0.395 mm-mrad) in the absence (lower surface) and presence (upper surface) of external magnetic field. The horizontal plane is located at the experimental value and the intersection curves represent the locus of twiss parameters for which the capture efficiency experimental value is obtained. This results in a higher beam current at the tungsten target which in turn results in a higher X-ray fluence at the treatment site which translates in potentially shorter treatment times.

The electron gun geometry in this example does not involve more complex geometries and configurations, e.g. a grid in front of the cathode and a focusing electrode kept at a different electric potential than the cathode. However, the more complex designs of electron guns, which work in external magnetic fields will have to incorporate the present electron gun characteristics as a starting point in the design procedure.

In this discussion, a method of determining new electron gun geometries is provided and simulated in the fringe field of an open bore split MRI magnet. The electron gun is capable of generating and accelerating electron beams in the presence of external magnetic fields without current loss. The beam characteristics proved to be suitable for injection into a medical linac and it was determined that the capture efficiency of the waveguide increases in the presence of external magnetic field. This results in shorter treatment times due to increased X-ray fluence. The simulation outcomes show there is no need for magnetic shielding of the electron gun. Such an electron gun can be used in in-line and RLA MRI-linac configurations where a magnetic shield is not a mandatory requirement.

The current invention provides an electron gun geometry capable of robustly functioning in the presence of high strength external magnetic field for axisymmetric configurations. This allows the MRI-linac to operate without the need to isolate the linac using a magnetic shield. This integration approach not only leaves the magnet homogeneity unchanged but also provides the linac the flexibility to move along the magnet axis of symmetry if the source to target distance needs to be adjusted.

The electron gun geometry modifications according to the current invention are considered and solved in external magnetic fields in order to determine a set of design principles for the new geometry. A new gun geometry is provided and simulated in the fringe field of a 0.5 T open bore MRI magnet (GE Signa SP) which has a 60 cm gap between its poles. Also a waveguide model for the Varian 600C linear accelerator (linac) is used to determine the capture efficiency of the new system in the presence of the fringe field of the MRI scanner. The linac is positioned in-line with the axis of symmetry of the MRI magnetic with the target button 100 cm away from the MRI-linac isocenter.

The geometry of the original electron gun geometry does not provide feasible solutions. The tests show that a smaller transverse cathode diameter with a flat surface could alleviate the current loss due to beam interactions with the anode in the presence of magnetic fields. It is shown that the new gun geometry of the current invention can generate and accelerate electron beams in external magnetic fields without current loss and without the need for a magnetic shield. It is also shown that the electron beam generated by the new gun is more effectively injected into the accelerating structure in the presence of external magnetic field resulting in a 20% increase of the current beam at the linac exit.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example the electron gun could have a grid to control the emitted current by applying a biased voltage between the cathode and the grid or auxiliary electrodes to better shape the beam at the anode entrance.

All such variations are considered to be within the scope and spirit of the present invention as defined by the following claims and their legal equivalents.

What is claimed:

1. A method of configuring an electron gun for generating and injecting an electron beam into a linac accelerating waveguide operating in magnetic fringe fields of an MRI scanner in the absence of a magnetic shield, comprising:

a) providing an in-line MRI-linac configuration with no magnetic shielding;

b) determining an anode drift tube diameter at an injection point of a linac of said in-line MRI-linac configuration, using an appropriately programmed computer, wherein said anode drift tube diameter is according to a value of a magnetic field from an MRI scanner of said in-line MRI-linac configuration and according to a predetermined current density, wherein said magnetic field comprises an isocenter, wherein twiss parameters are used by said appropriately programmed computer to determine a length of said anode drift tube, wherein said twiss parameters are according to axial position and capture efficiency of said linac;

c) determining a transverse diameter of a Type M cathode in an electron gun, using said appropriately programmed computer, wherein said transverse diameter of said cathode is according to said anode drift tube diameter and said current density; and d) minimizing a value of emittance in an electron beam of said electron gun at an entry point of said anode drift tube, using said appropriately programmed computer, wherein said minimization comprises optimizing the distance between said cathode and said anode, wherein said electron beam is directed proximal to an axis of symmetry of said MRI magnetic field, wherein an electron gun is configured for generating and injecting an electron beam into a linac accelerating waveguide operating in magnetic fringe fields of said MRI scanner in the absence of said magnetic shield.

2. The method of configuring an electron gun according to claim 1, wherein said linac is aligned with field lines of said MRI scanner.

3. The method of configuring an electron gun according to claim 1, wherein a path of said electron beam and a main magnetic field of said MRI scanner are in-line.

4. The method of configuring an electron gun according to claim 1, wherein said beam emittance comprises a figure of merit, wherein said figure of merit is used to determine a beam laminarity.

5. The method of configuring an electron gun according to claim 1, wherein a focusing electrode is disposed proximal to said cathode, wherein divergence of electric field lines in said linac injection point are reduced.

* * * * *